(12) United States Patent
Henderson et al.

(10) Patent No.: US 9,868,180 B2
(45) Date of Patent: Jan. 16, 2018

(54) TURBINE BLADE TIP REPAIR USING DUAL FUSION WELDING

(71) Applicant: ANSALDO ENERGIA IP UK LIMITED, London (GB)

(72) Inventors: Brian L. Henderson, Port Saint Lucie, FL (US); David R. Kaser, Clover, SC (US); Warren Martin Miglietti, Jupiter, FL (US); Andrew C. Pappadouplos, Fort Pierce, FL (US)

(73) Assignee: ANSALDO ENERGIA IP UK LIMITED (GB)

( * ) Notice: Subject to any disclaimer, the term of this patent is extended or adjusted under 35 U.S.C. 154(b) by 701 days.

(21) Appl. No.: 14/211,657

(22) Filed: Mar. 14, 2014

(65) Prior Publication Data

US 2014/0259668 A1    Sep. 18, 2014

Related U.S. Application Data

(60) Provisional application No. 61/783,904, filed on Mar. 14, 2013, provisional application No. 61/783,879, filed on Mar. 14, 2013.

(51) Int. Cl.
*B23P 6/00* (2006.01)
*F01D 5/00* (2006.01)
(Continued)

(52) U.S. Cl.
CPC .............. *B23P 6/002* (2013.01); *B23H 9/10* (2013.01); *B23K 26/34* (2013.01); *B24B 19/14* (2013.01); *F01D 5/005* (2013.01); *F01D 5/18* (2013.01); *F01D 5/20* (2013.01); *B23K 2201/001* (2013.01); *B23P 6/007* (2013.01); *F05D 2220/32* (2013.01); *F05D 2230/12* (2013.01); *F05D 2230/234* (2013.01); *F05D 2230/30* (2013.01); *F05D 2230/80* (2013.01); *F05D 2240/307* (2013.01); *Y10T 29/49318* (2015.01)

(58) Field of Classification Search
CPC .......... B23P 6/002; B23P 6/007; B24B 19/14; B23H 9/10; B23K 26/34; B23K 2201/001; F01D 5/18; F01D 5/005; F01D 5/20; F05D 2230/12; F05D 2230/30; F05D 2220/32; F05D 2240/307; F05D 2230/80; F05D 2230/234; Y10T 29/49318
See application file for complete search history.

(56) References Cited

U.S. PATENT DOCUMENTS 6,332,272 B1 *  12/2001  Sinnott ................... B23P 6/002
                                                29/402.08
2012/0000890 A1 *  1/2012  Ito ........................... B23P 6/007
                                                219/76.1

* cited by examiner

*Primary Examiner* — Ryan J Walters
(74) *Attorney, Agent, or Firm* — Hovey Williams LLP

(57) ABSTRACT

A method for repairing a blade tip of a turbine blade based on a dual fusion weld process for portions of a tip plate and a mechanical locking bead over the tip plate. A damaged portion of blade is removed. The damaged portion is removed at an initial cut level. An undamaged portion of the turbine blade exists as a base below the initial cut level. A replacement section is rebuilt via laser cladding. The replacement section is machined to form a tip pocket. A tip plate is placed in the tip pocket. The tip plate comprises at least a first portion and a second portion. The tip plate is welded using a dual fusion weld process comprising a first weld process and a second weld process. A squealer tip is built using a welding process that forms a mechanical locking bead over the tip plate.

19 Claims, 6 Drawing Sheets

(51) Int. Cl.
*F01D 5/20* (2006.01)
*B23H 9/10* (2006.01)
*B23K 26/34* (2014.01)
*B24B 19/14* (2006.01)
*F01D 5/18* (2006.01)
*B23K 101/00* (2006.01)

TURBINE BLADE TIP REPAIR USING DUAL FUSION WELDING

CROSS-REFERENCE TO RELATED APPLICATIONS

This application claims priority to U.S. Provisional Application Ser. No. 61/783,904, filed Mar. 14, 2013, entitled "TURBINE BLADE TIP REPAIR," and U.S. Provisional Application Ser. No. 61/783,879, filed Mar. 14, 2013, entitled "DEEP TRAILING EDGE REPAIR," which are both incorporated herein by reference in their entirety.

TECHNICAL FIELD

The present invention generally relates to repairing the damaged tip of a turbine blade. More specifically, the present invention relates to a dual fusion weld process for portions of a tip plate and a mechanical locking bead over the tip plate both used in repairing a damaged tip of a turbine blade.

BACKGROUND OF THE INVENTION

Gas turbine engines operate to produce mechanical work or thrust. Specifically, land-based gas turbine engines typically have a generator coupled thereto for the purposes of generating electricity. A gas turbine engine comprises an inlet that directs air to a compressor section, which has stages of rotating compressor blades. As the air passes through the compressor, the pressure of the air increases. The compressed air is then directed into one or more combustors where fuel is injected into the compressed air and the mixture is ignited. The hot combustion gases are then directed from the combustion section to a turbine section by a transition duct. The hot combustion gases cause the stages of the turbine to rotate, which in turn, causes the compressor to rotate.

The hot combustion gases are directed through a turbine section by turbine blades and vanes. Stationary turbine vanes precede each stage of rotating blades in order to direct the flow of hot combustion gases onto the blades at the appropriate angle to maximize turbine efficiency. These blades and vanes are subject to extremely high operating temperatures, stresses, and strains. The blades may include one or more cooling passages formed below the surface for the passage of cooling air. Nonetheless, gas turbine blades in particular, may experience degradation, such as wear, nicks, dents, and corrosion. Some degradation may be repairable which presents a viable alternative to the high-replacement costs of blades. Blade repairs vary depending on the blade configuration but repairs are generally directed to blade tips or tip shrouds, typically using a weld overlay process. Blade repair techniques continue to be improved to provide a repaired replacement part that functions just as well as a new part.

SUMMARY

Embodiments of the present invention provide a novel method and configuration for repairing a turbine component such as a blade tip using a dual fusion weld process for welding at least two portions of a tip plate and additionally a mechanical locking bead over the tip plate. In this regard, additional structural integrity is provided to the retention of the tip plate. Consequently, embodiments of the present invention allow for the extension of the life of the repaired blade tip, by first, adding a standard fusion type weld to hold the tip plate in position and second, enhancing the fusion weld by adding real mechanical interlocking of the tip plate into a tip assembly of the blade.

Repairing the blade tip of a damaged blade includes removing distress damage from the blade and reviewing the blade tip for service. Upon a determination to service the blade, the tip of the blade is removed down to a specified level. Damaged material may be cleaned out from the tip. The inner cavities, including the ribs of cooling passages, may become exposed on the surface with removal of the damaged material. The surface for repair may advantageously be flat. Laser cladding may be performed on the blade tip using a powder alloy to build the tip back to the level where the squealer tip may be added back in. The clad build up provides a surface for creating a tip pocket using a machining process. The cooling passages of the blade are then covered with a tip plate. The tip pocket may be specifically configured to receive the tip plate. Advantageously, the tip plate includes a first portion for covering a first set of cooling passages and a second portion for covering a second set of cooling passages. Each of the portions of the tip plate may be precisely configured to the shape of the pocket.

The tip plate may then be fusion welded with the laser only. No powder is added in during the welding process. The laser may be moved circumferentially around the tip plate and also across each exposed rib of the cooling passages. The tip plate may be further fused to the blade assembly by fusion welding through the tip plate at rib locations such that the tip plate and the blade assembly are joined together. Advantageously, the first portion and the second portion of the tip plate may be fused at a specific exposed rib of the cooling passages. In this regard, the tip plate is fusion welded into the rib and also the first portion and second portion of the tip plate are fusion welded together. A laser cladding process is then used to build up the remaining portion of the squealer tip. The secondary pass of laser cladding locks the tip plate into position. The additional laser cladding fusion comes over the top of the fusion weld, in the form of a locking bead, for mechanical locking of the tip plate.

Accordingly, in a first embodiment of the present invention, a method for repairing a blade tip of a turbine blade is provided. The method includes removing a damaged portion of blade. The damaged portion is removed at an initial cut level. The undamaged portion of the turbine blade exists as a base below the initial cut level. The method includes welding a replacement section to the base. The method also includes machining the replacement section to form a tip pocket. The method also includes placing a tip plate in the tip pocket. The tip plate comprises at least a first portion and a second portion. The method further includes welding the tip plate using a dual fusion weld process comprising a first weld process and a second weld process. The method also includes building a squealer tip using a welding process that forms a mechanical locking bead over the tip plate.

In a second embodiment of the present invention, a method for repairing a blade tip of a turbine blade is provided. The method includes removing a damaged portion of blade. The damaged portion is removed at an initial cut level. An undamaged portion of the turbine blade exists as a base below the initial cut level. The method further includes welding a replacement section to the base. The method also includes machining the replacement section to form a tip pocket. The method includes placing a tip plate in the tip pocket. The tip plate comprises a first portion and a second portion. Each of the first portion and the second portion interface vertically with one or more ribs of the turbine blade. The method includes welding the tip plate using a dual fusion weld process comprising a first weld process and a second weld process, the second weld process comprises the tip plate being welded at the one or more ribs interfacing with the first portion and the second portion. The method includes building a squealer tip using a welding process that forms a mechanical locking bead over the tip plate.

In a third embodiment of the present invention, a method for repairing a blade tip of turbine blade is provided. The method includes removing a damaged portion of blade. The damaged portion is removed at an initial cut level using a machining process; an undamaged portion of the turbine blade exists as a base below the initial cut level. The method also includes welding a replacement section to the base, welding a replacement section includes laser cladding build up. The method further includes machining an excess laser cladding build up forming a tip pocket. The method includes placing a tip plate in the tip pocket; the tip plate comprises a first portion and a second portion. The method also includes welding the tip plate using a dual fusion weld process comprising a first welded process and a second weld process, the first weld process comprises the tip plate being welded circumferentially to the blade tip, and the second weld process comprises the tip plate being welded at a first rib, a second rib, a third rib, and a fourth rib of the turbine blade. The first portion and the second portion interface at the third rib of the blade tip. Each end of the first portion and the second portion of the tip plate is welded to a corresponding portion of the tip plate and the blade tip. The method also includes building a squealer tip using a welding process that forms a mechanical locking bead over the tip plate, the welding process comprises welding circumferentially over the plate. The welding process is a laser cladding process.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Figure 1:
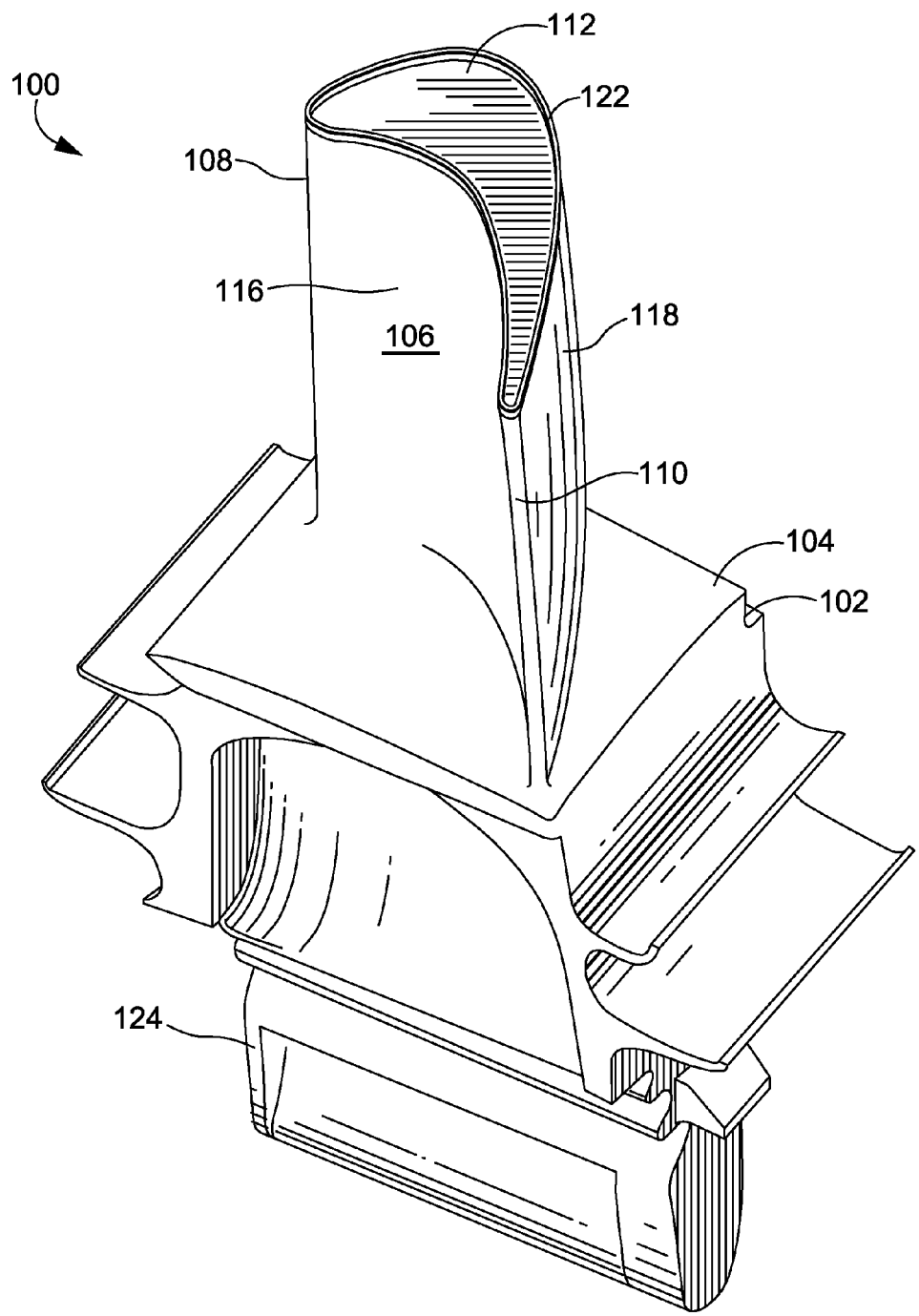
FIG. 1 is a perspective view of a turbine blade in accordance with an embodiment of the present invention.
Figure 2A:
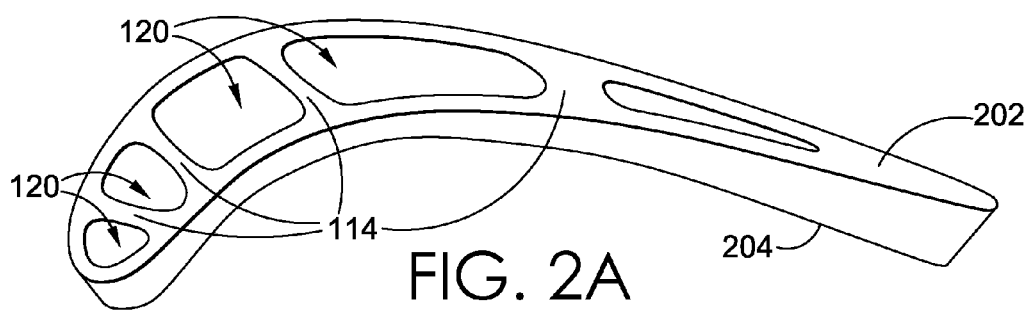
FIGS. 2A-2F are top views of a turbine blade in repair, in accordance with an embodiment of the present invention.

Referring initially to FIG. 1, a gas turbine blade 100 includes a platform portion 102 having a generally planar gas path surface 104 and an airfoil 106 extending radially outward from the platform. The airfoil 106 includes a leading edge 108, a trailing edge 110, and a tip plate 112. In embodiments, the turbine blade 100 may further include a plurality of cooling passages 120 forming one or more ribs 114, as best shown in FIG. 2A, and a squealer tip 122 extending above the tip plate 112. The airfoil 104 further includes a first sidewall 116 and a second sidewall 118. The first sidewall 116 is concave and defines a pressure side and the second sidewall 118 is convex and defines a suction side. The first sidewall 116 and second sidewall 118 extend longitudinally and radially outward from a root 124 to the tip plate 112. The tip plate 112 defines a radially outer boundary of airfoil 106. The tip plate 112 extends between the leading edge 108 and the trailing edge 110. The one or more ribs 114 of the plurality of cooling passages extend from the interior of the blade between the leading edge and the trailing edge.

With reference to FIGS. 2A-2F, first the damaged portion of the tip blade is removed. The damaged portion may include the squealer tip 122 and the tip plate 112 of the blade tip. The damaged portion may be removed to an initial cut level 202. Removing the damage to the initial cut level 202 may be done using a machining process. The initial cut level 202 may advantageously provide a flat repair surface on the tip plate. The initial cut level 202 may expose one or more ribs 114 of the cooling passages 120 of the turbine blade. In embodiments, four ribs of the cooling passages are exposed after at the initial cut level 202. Below the initial cut level may be the existing base 204 of the blade.

Figure 2B:
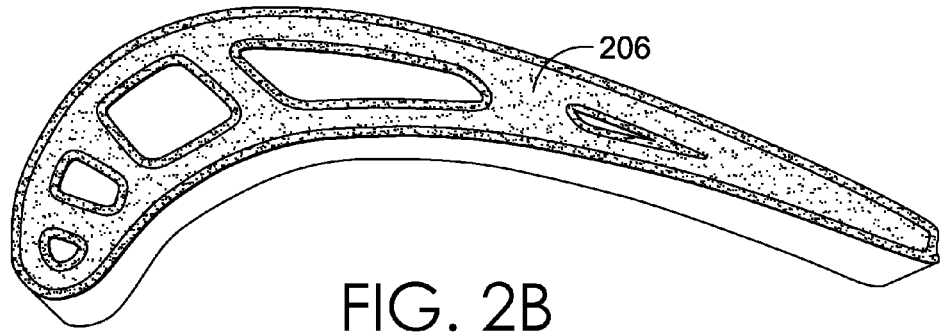
Figure 2C:
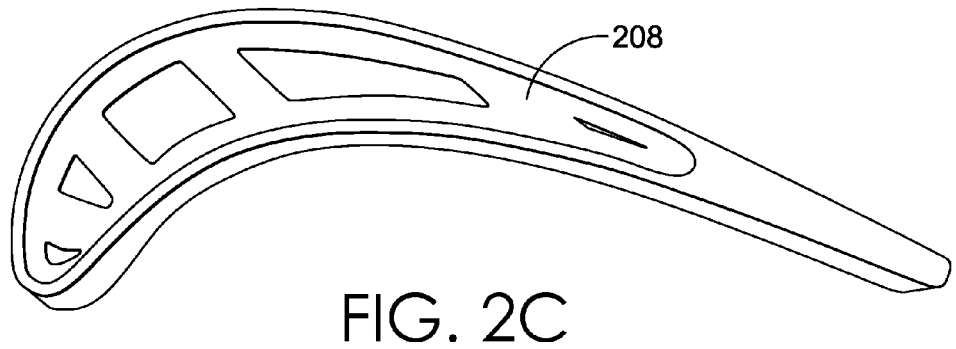

Initially the damaged portion of the tip blade is weld repaired. The weld repair process may a laser cladding process or by weld deposition process. In particular, the laser cladding that builds up cladding 206 above the initial cut line of the blade tip, as shown in FIG. 2B. A composition is provided initially in the form of a powder and is applied (e.g., as a layer) to the blade tip by fusing the power to the blade tip. The weld deposition process may include providing the composition in a convenient physical form to feed it into a welding torch on the surface of the blade tip. Advantageously, the initial welding process may include the following parameters found to limit the amount of cracking and over deposit of filler material during the weld process. Filler material may include Merl 72, Haynes 230, Haynes 282 or other materials of similar composition. The laser or manual welding process may require power between 30 W and 12000 W and preferably 300 W to 9000 W at a travel rate 0.3 inches per minute to 500 inches per minute and a shield gas of $CO_2$ or Ar or any combination thereof. It is contemplated within embodiments of the present invention that a tip pocket may be formed from the weld build up using a machining process, as shown in FIG. 2C. In embodiments the machining process is an Electrical Discharge Machining process (EDM). The EDM process may be used to form the tip pocket 208 which receives the tip plate.

Figure 2D:
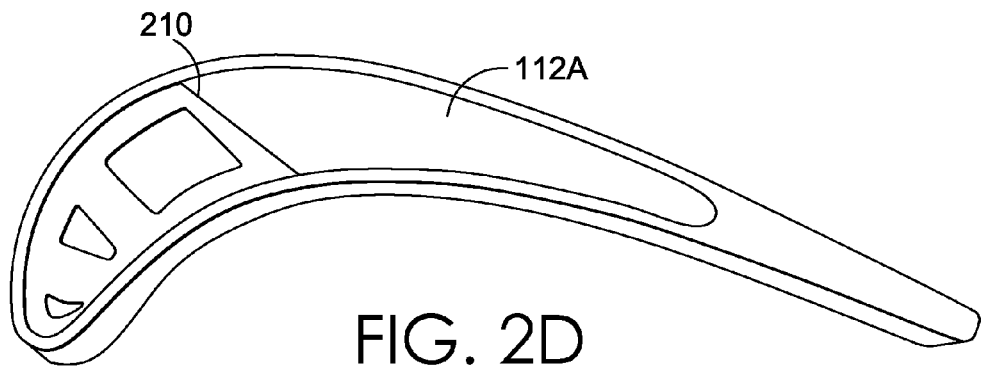
Figure 2E:
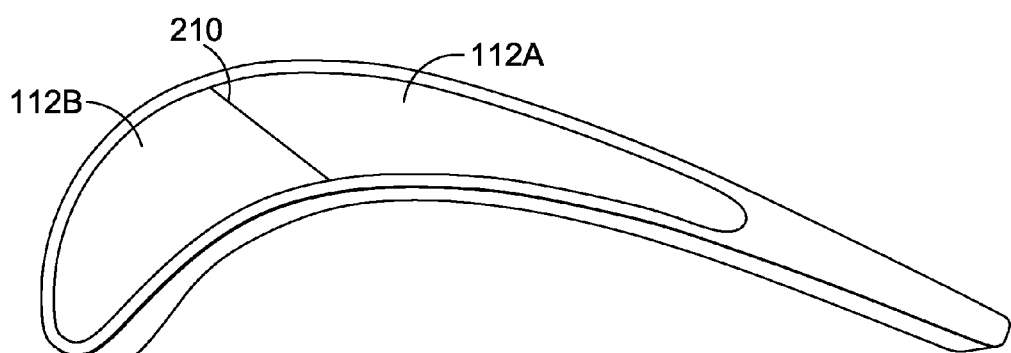
Figure 2F:
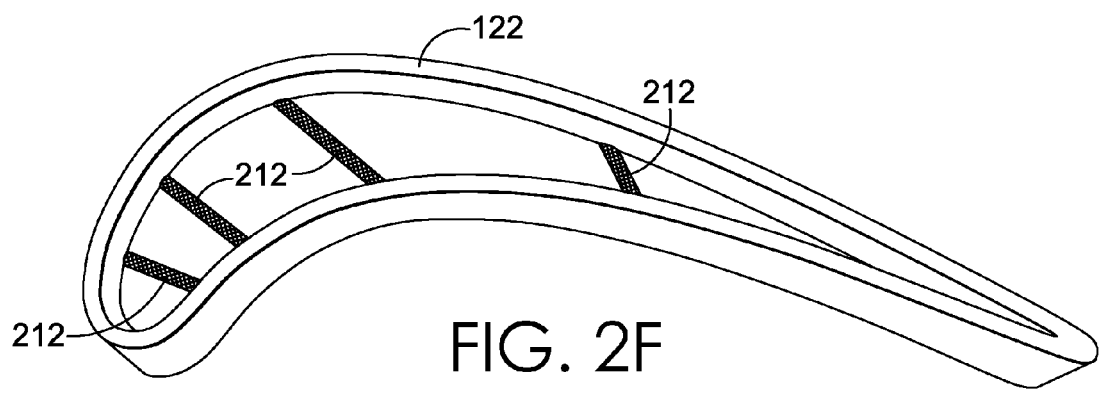
Figure 3A:
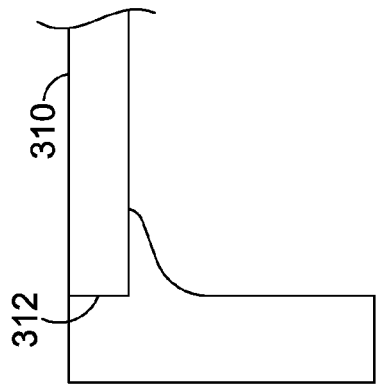
FIGS. 3A-3I is a schematic diagram of a turbine blade in repair, in accordance with an embodiment of the present invention.
Figure 3B:
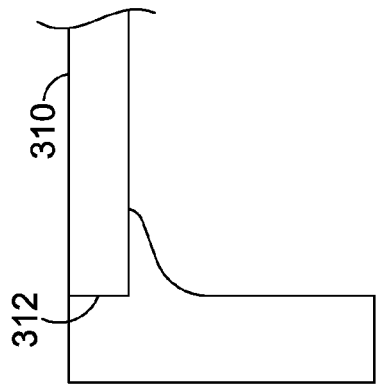
Figure 3C:
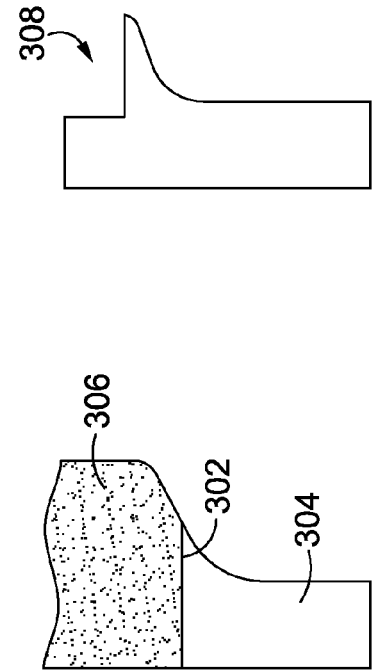
Figure 3D:
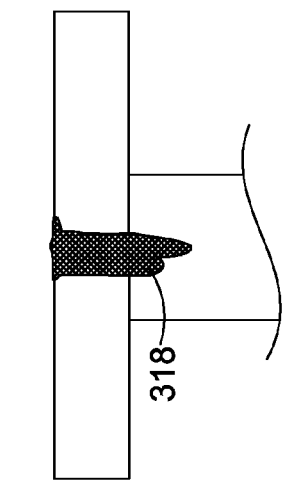
Figure 3E:
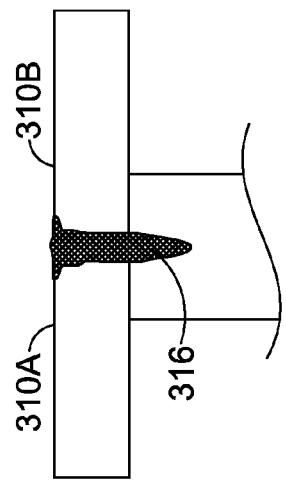
Figure 3F:
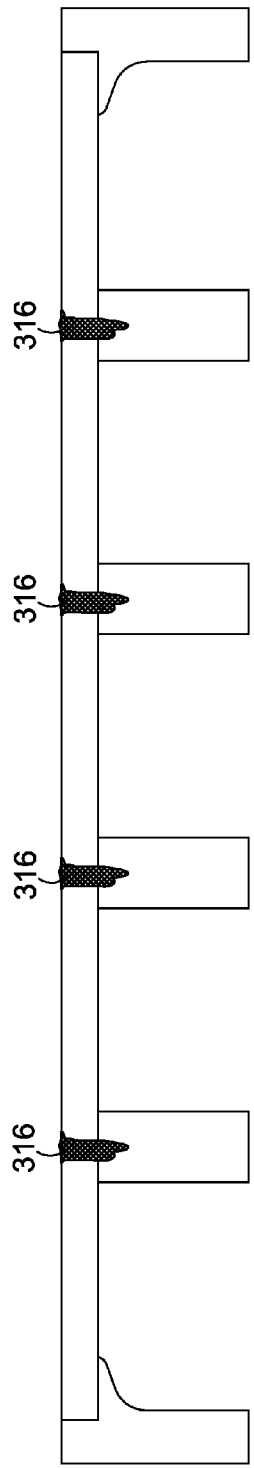
Figure 3I:
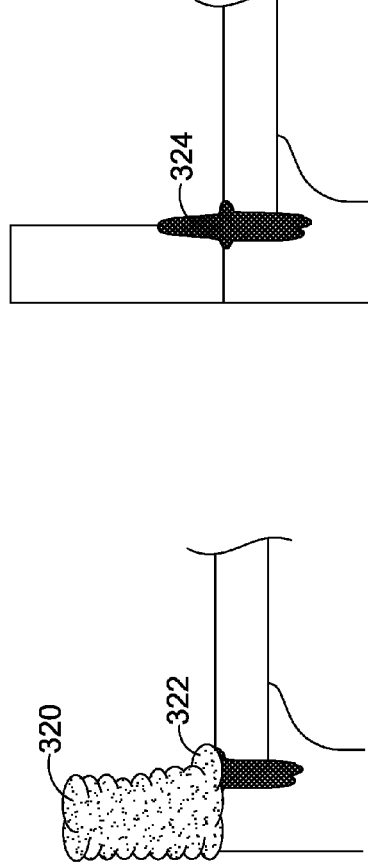
Figure 3H:
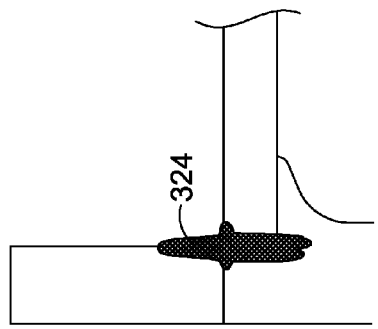
Figure 3G:
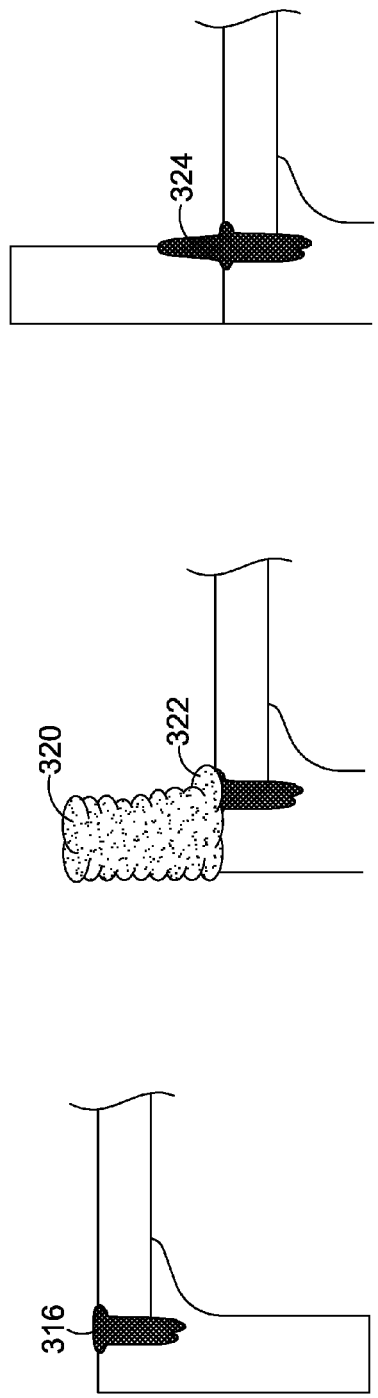

The replacement tip plate may be attached by welding as shown in FIGS. 2D, 2E, and 2F. The tip plate may include a plurality of portions (e.g., 112a and 112b). Advantageously, the tip plate includes a first portion 112a and a second portion 112b. The first portion 112a and the second portion 112b may advantageously interface proximate a center portion 210 of the blade tip. Using multiple plates provides for additional structural integrity upon using the processes described herein. In particular, the plurality of portions of the plate may be welded to the blade assembly at different parts of the blade tip. Further, the plurality of portions of the tip plate may be welded to the blade assembly using a fusion welding process. The portions of the tip plate may be precisely cut to fit on the tip pocket 208 of the blade tip. The tip plate 112 may be dual fusion welded at an end of the tip plate and also at a circumference portion of the tip plate and the blade. In addition, the first portion 112a and the second portion 112b may each have a first end and a second end respectively each welded to each other and through to the ribs of the blade. In embodiments, the blade may include a first rib, second rib, third rib, and fourth rib. The first portion 112a and second portion 112b may join at the third rib. In addition the fourth rib may be welded with two passes.

Fusion welding may be used to fuse the juxtaposed interface surfaces of the blade assembly and the tip plate. The interfacing surfaces may be horizontal-surfaces of the plurality of portions of the tip plate touching each other, or vertical-surfaces of the plurality of portions of the tip plate touching the ribs. Fusion welding (e.g., fusion weld 212) may include providing energy to generate heat to enable joining or bonding of cooperating interface surfaces. Heat may be applied at the juxtaposed interface surfaces for a time sufficient to result in melting and intermixing element of the alloys being joined. The process further includes a welding process for building the squealer tip 212. The secondary welding pass may be either laser welding or a weld deposition process as described above. The welding process provides for mechanical locking of tip with a locking bead. The laser may be moved circumferentially around the tip to form the locking bead below the squealer around the circumference of the tip plate.

With reference to FIGS. 3A-3I, they illustrate an alternative perspective showing tip repair according to embodiments of the present invention. First the damaged portion of the tip blade is removed. The damaged portion may be removed to an initial cut level 302. Removing the damage to the initial cut level 302 may be done using a machining process. Below the initial cut level may be the existing base 304 of the blade. The damaged portion of the tip blade is weld repaired. The weld repair process may a laser cladding process or by weld deposition process. In particular, the laser cladding that builds up cladding 306 above the initial cut line of the blade tip, as shown in FIG. 2B. A tip pocket may be formed from the weld build up using a machining process. In embodiments the machining process is an Electrical Discharge Machining process (EDM). The EDM process may be used to form the tip pocket 308 which receives the tip plate.

The replacement tip plate 310 may be attached by welding. The replacement tip plate 310 may be placed using fusion tack welding 312 of the plate into position. The tip plate 310 may include a plurality of portions (e.g., 310A and 310B). Using multiple plates provides for additional structural integrity upon using the processes described herein. The tip plate 310 may be dual fusion welded 314 at an end of the tip plate and also at a circumference portion of the tip plate and the blade. In addition, the first portion 310A and the second portion 310B may each have a first end and a second end respectively each welded to each other and through 316 to the ribs of the blade. In embodiments, the blade may include a first rib, second rib, third rib, and fourth rib. The first portion 310a and second portion 310b may join at the third rib. In addition the fourth rib may be welded with two passes 318.

Further, a welding process is used for building the squealer tip 320. The secondary welding pass may be either laser welding or a weld deposition process as described above. The welding process provides for mechanical locking of tip with a locking bead 322. The laser may be moved circumferentially around the tip to form the locking bead below the squealer tip and around the circumference of the tip plate 324.

Figure 4:
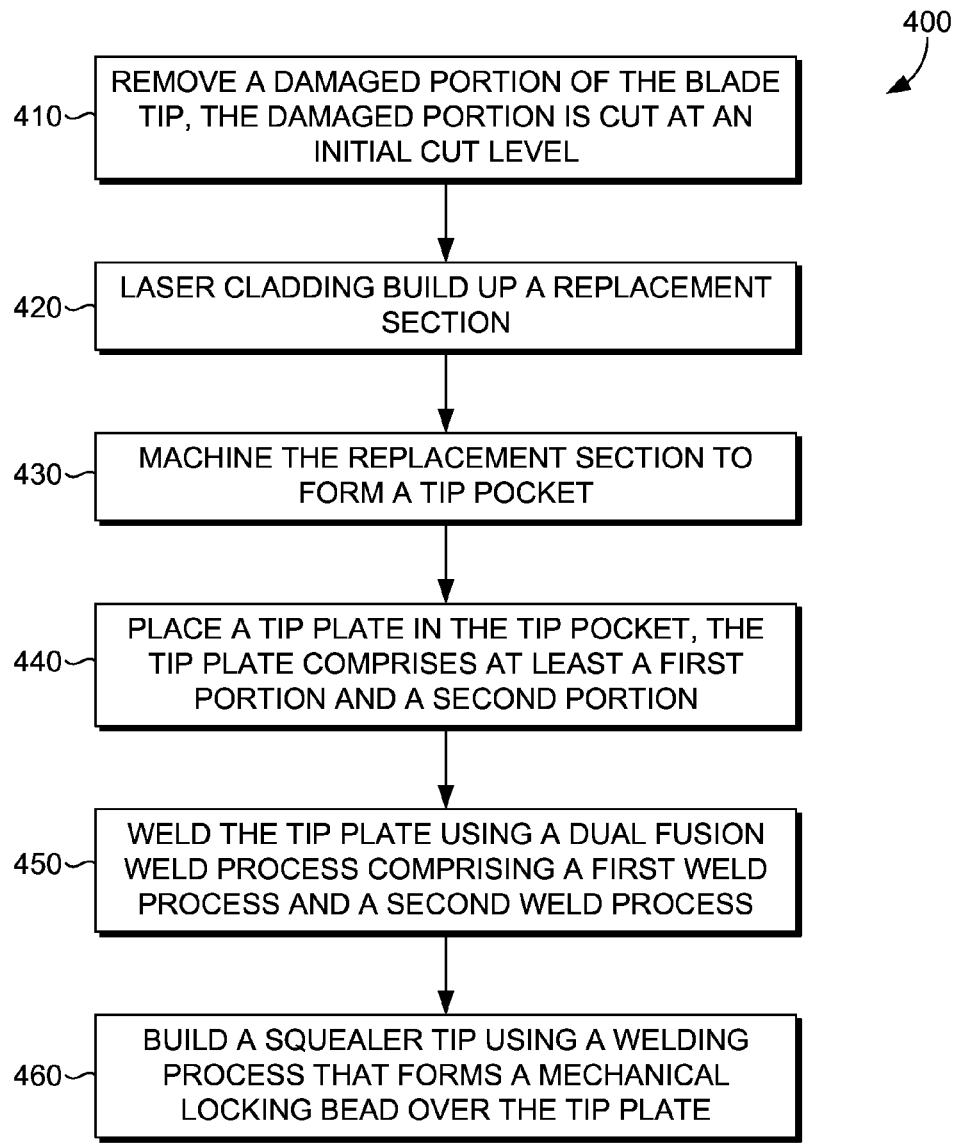
FIG. 4 is a flow diagram depicting turbine blade tip repair, in accordance with an embodiment of the present invention.

Turning now to FIG. 4, a flow diagram is provided that illustrates a method 400 for repairing a blade tip of turbine blade. At block 410, a damaged portion of a blade tip is removed. The damaged portion is removed at an initial cut level. An undamaged portion of the turbine blade exists as a base below the initial cut level. At block, 420, a replacement section is welded to the base. At block 430, the replacement section is machined to form a tip pocket. At block 440, a tip plate is placed in the tip pocket; the tip plate comprises at least a first portion and a second portion. At block 450, the tip plate is welded using a dual fusion weld process comprising a first weld process and a second weld process. At block 460, a squealer tip is built using a welding process that forms a mechanical locking bead over the tip plate.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A method for repairing a blade tip of a turbine blade, the method comprising:
   removing a damaged portion of the blade tip, wherein the damaged portion is removed at an initial cut level, wherein an undamaged portion of the turbine blade exists as a base below the initial cut level;
   laser cladding build up a replacement section to the base;
   machining the replacement section to form a tip pocket;
   placing a tip plate in the tip pocket, wherein the tip plate comprises at least a first portion and a second portion;
   welding the tip plate using a dual fusion weld process comprising a first weld process and a second weld process; and
   building a squealer tip using a welding process that forms a mechanical locking bead over the tip plate.

2. The method of claim 1, wherein the first portion and the second portion interface at a rib of the blade tip.

3. The method of claim 1, wherein the first weld process comprises the tip plate being welded circumferentially to the blade tip.

4. The method of claim 1, wherein the second weld process comprises the tip plate being welded at a corresponding one or more ribs of the turbine blade.

5. The method of claim 1, wherein each end of the first portion and the second portion of the tip plate is welded to a corresponding portion of the tip plate and the blade tip.

6. The method of claim 1, wherein at least one rib is welded with two passes using a fusion weld process.

7. The method of claim 6, wherein the step of building the squealer tip using a welding process comprises welding circumferentially over the plate.

8. The method of claim 7, wherein the welding process is a laser cladding process.

9. The method of claim 1, wherein the step of building the squealer tip using a welding process comprises welding circumferentially over the plate.

10. The method of claim 9, wherein the welding process is a laser cladding process with power between 30 W and 12000 W at a travel rate 0.3 inches per minute to 500 inches per minute and a shield gas of CO2 and/or Ar.

11. A method for repairing a blade tip of a turbine blade, the method comprising:
removing a damaged portion of blade, wherein the damaged portion is removed at an initial cut level, wherein an undamaged portion of the turbine blade exists as a base below the initial cut level;
laser cladding build up a replacement section to the base;
machining the replacement section to form a tip pocket;
placing a tip plate in the tip pocket, wherein the tip plate comprises a first portion and a second portion, wherein each of the first portion and the second portion interface vertically with one or more ribs of the turbine blade;
welding the tip plate using a dual fusion weld process comprising a first weld process and a second weld process, wherein the second weld process comprises the tip plate being welded at the one or more ribs interfacing with the first portion and the second portion; and
building a squealer tip using a welding process that forms a mechanical locking bead over the tip plate.

12. The method of claim 11, wherein the first weld process comprises the tip plate being welded circumferentially to the blade tip.

13. The method of claim 11, wherein each end of the first portion and the second portion of the tip plate is welded to a corresponding portion of the tip plate and the blade tip.

14. The method of claim 11, wherein the one or more ribs comprises a first rib, a second rib, a third rib, and a fourth rib of the turbine blade, wherein the first portion and the second portion interface at the third rib of the turbine blade.

15. The method of claim 14, wherein the second weld process comprises the tip plate being welded at the first rib, the second rib, the third rib, and the fourth rib of the turbine blade.

16. The method of claim 15, wherein the fourth rib is welded with two passes.

17. The method of claim 16, wherein the second weld process is a fusion weld process.

18. A method for repairing a blade tip of a turbine blade, the method comprising:
removing a damaged portion of blade, wherein the damaged portion is removed at an initial cut level using a machining process, wherein an undamaged portion of the turbine blade exists as a base is below the initial cut level;
welding a replacement section to the base, wherein welding a replacement section includes laser cladding build up;
machining an excess laser cladding build up forming a tip pocket;
placing a tip plate in the tip pocket, wherein the tip plate comprises a first portion and a second portion, wherein the first portion and the second portion interface at the third rib of the blade tip;
welding the tip plate using a dual fusion weld process comprising a first welded process and a second weld process, wherein the first weld process comprises the tip plate being welded circumferentially to the blade tip, and the second weld process comprises the tip plate being welded at a first rib, a second rib, a third rib, and a fourth rib of the turbine blade, and each end of the first portion and the second portion of the tip plate being welded to a corresponding portion of the tip plate and the blade tip; and
building a squealer tip using a welding process that forms a mechanical locking bead over the tip plate, wherein the welding process comprises welding circumferentially over the plate, and wherein the welding process is a laser cladding process.

19. The method of claim 18, wherein each of the first portion and the second portion interface vertically with portions of at least one of the first rib, the second rib, the third rib, and the fourth rib.

* * * * *